US011156370B2

(12) United States Patent
Sørensen et al.

(10) Patent No.: US 11,156,370 B2
(45) Date of Patent: Oct. 26, 2021

(54) HYDRAULIC DISTRIBUTER FOR A HYDRAULIC HEATING AND/OR COOLING SYSTEM

(71) Applicant: GRUNDFOS HOLDING A/S, Bjerringbro (DK)

(72) Inventors: Søren Emil Sørensen, Ulstrup (DK); Rasmus Hessellund Andersen, Åbyhøj (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 363 days.

(21) Appl. No.: 15/034,317

(22) PCT Filed: Nov. 4, 2014

(86) PCT No.: PCT/EP2014/073723
§ 371 (c)(1),
(2) Date: May 4, 2016

(87) PCT Pub. No.: WO2015/067610
PCT Pub. Date: May 14, 2015

(65) Prior Publication Data
US 2016/0273782 A1  Sep. 22, 2016

(30) Foreign Application Priority Data

Nov. 7, 2013 (EP) .................................. 13192027

(51) Int. Cl.
*F24D 3/14* (2006.01)
*F24D 3/10* (2006.01)
(Continued)

(52) U.S. Cl.
CPC ........... *F24D 3/146* (2013.01); *F24D 3/1075* (2013.01); *F24D 3/125* (2013.01);
(Continued)

(58) Field of Classification Search
CPC .................................. F24D 5/10; F24D 3/105
(Continued)

(56) References Cited

U.S. PATENT DOCUMENTS

| 4,770,341 A * | 9/1988 | Drake ..................... F16L 41/03 137/271 |
| 6,345,770 B1 | 2/2002 | Simensen |

(Continued)

FOREIGN PATENT DOCUMENTS

| DE | 10 2006 010562 A1 | 9/2007 |
| DE | 20 2009 003093 U1 | 9/2010 |
| WO | 2008/041897 A1 | 4/2008 |

*Primary Examiner* — Kenneth J Hansen
*Assistant Examiner* — John E Bargero
(74) *Attorney, Agent, or Firm* — McGlew and Tuttle, P.C.

(57) ABSTRACT

A hydraulic manifold for hydraulic heating and/or cooling systems includes a feed conduit and a return conduit. The feed conduit includes at least one feed connection and the return conduit includes at least one return connection, for the connection of a load circuit. The manifold has a modular construction with a main module and connected load module(s). The main module includes a section of the feed conduit and/or of the return conduit as well as an electric connection. The load module includes a section of the feed conduit with a feed connection, and/or a section of the return conduit with a return connection, as well as at least one regulating device for regulating the flow through a load circuit connected to the feed connection and to the return connection. The main module includes a manifold control device for the control of the regulating device in the load module(s).

18 Claims, 10 Drawing Sheets

(51) Int. Cl.
    *F24D 3/12*          (2006.01)
    *F24D 19/10*       (2006.01)
    *F24F 5/00*         (2006.01)

(52) U.S. Cl.
    CPC ..... *F24D 19/1012* (2013.01); *F24D 19/1015* (2013.01); *F24F 5/0089* (2013.01); *Y02B 30/00* (2013.01); *Y02B 30/70* (2013.01)

(58) Field of Classification Search
    USPC ...................................... 237/8 A; 165/104.31
    See application file for complete search history.

(56) References Cited

U.S. PATENT DOCUMENTS

| | | | | |
|---|---|---|---|---|
| 2002/0000257 | A1* | 1/2002 | Mead | F15B 13/0817 |
| | | | | 137/884 |
| 2009/0020270 | A1* | 1/2009 | Strelow | F24D 3/1066 |
| | | | | 165/104.31 |
| 2011/0290328 | A1* | 12/2011 | Jonsson | F25B 30/02 |
| | | | | 137/1 |
| 2015/0089963 | A1* | 4/2015 | Tan | F24F 11/83 |
| | | | | 62/56 |
| 2016/0003561 | A1* | 1/2016 | Casper | F28F 13/06 |
| | | | | 165/201 |

* cited by examiner

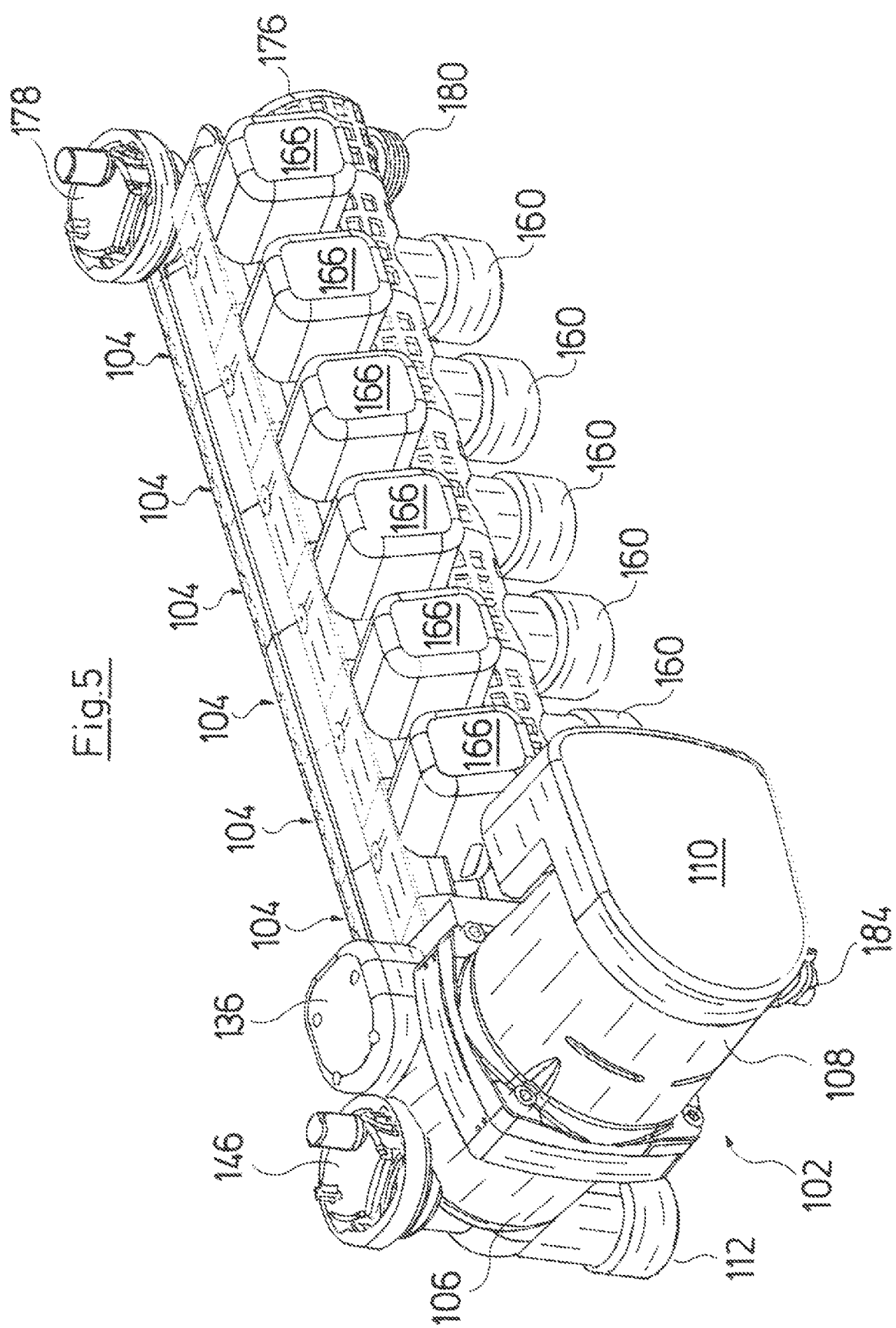

HYDRAULIC DISTRIBUTER FOR A HYDRAULIC HEATING AND/OR COOLING SYSTEM

CROSS REFERENCE TO RELATED APPLICATIONS

This application is a United States National Phase Application of International Application PCT/EP2014/073723 filed Nov. 4, 2014 and claims the benefit of priority under 35 U.S.C. § 119 of European Patent Application 13 192 027.4 filed Nov. 7, 2013 the entire contents of which are incorporated herein by reference.

FIELD OF THE INVENTION

The invention relates to a hydraulic manifold for a hydraulic heating and/or cooling system, with a feed conduit and a return conduit, wherein the feed conduit comprises at least one feed connection and the return conduit comprises at least one return connection, for the connection of a load circuit.

BACKGROUND OF THE INVENTION

Hydraulic manifolds are provided in floor heating systems for example, to which manifolds the individual floor heating circuits are connected. The manifolds thereby are essentially formed from two pipes, from a pipe which forms a feed conduit, and a pipe which forms a return conduit. A certain number of connections for the individual heating circuits or load circuits are provided on the two pipes, wherein each circuit with one end is connected to the feed conduit and with the other end to a connection of the return conduit. The disadvantage with these hydraulic manifolds is the fact that they are manufactured for a certain number of heating circuits, so that different manifolds must be kept available for different heating installations with different numbers of load circuits.

SUMMARY OF THE INVENTION

With regard to this problem, it is an object of the invention to provide a hydraulic manifold for a hydraulic heating and/or cooling system, which can be universally applied to heating installations with different numbers of load circuits.

The hydraulic manifold according to the invention forms an assembly and can be applied in a hydraulic heating and/or cooling system, i.e. in a heating and/or cooling system which uses a fluid or a liquid as a heat transfer medium. Preferably, with regard to the fluid it is the case of water. The heat transfer medium departing from a heat source or cold source is led through pipe conduits into the rooms or buildings to be thermally regulated (closed-loop controlled). The hydraulic manifold according to the invention is provided for distributing the fluid onto several load circuits. The hydraulic manifold for this comprises a feed conduit and a return conduit. The entries of the load circuits are connected onto the feed conduit and the exits of the load circuits are connected onto the return conduit. The feed conduit and the return conduit then in turn are connected to the heating or cooling installation, i.e. via further pipe conduits to a heat and/or cold source. Thereby, it is to be understood that the system can be designed exclusively as a heating system or exclusively as a cooling system or however as a system which can serve for heating as well as cooling. Thus, for example, the system can be used in summer for cooling and in winter for heating.

The feed conduit comprises at least one feed connection and the return conduit comprises at least one return connection, onto which connections at least one load circuit is connected. Thereby, the entry of the load circuit is connected onto the feed connection and the exit of the load circuit is connected onto the return connection.

The hydraulic manifold according to the invention is constructed in a modular manner, in order to permit a universal application of the hydraulic manifold for heating or cooling systems with different numbers of load circuits. It comprises at least one main module and at least one load module which is scheduled removable onto the main module. The main module serves for the supply and the control, whilst the load module serves for the connection of a load circuit. If several load circuits are present, a corresponding number of load modules, i.e. one load module per load circuit are provided. The modular construction permits a desired number of load modules to be connected to the one main module for the adaptation of the hydraulic manifold to a specific cooling system or heating system. The composed modules then form an assembly. For this, the main module comprises at least one section of the feed conduit and/or of the return conduit, as well as an electrical connection. Particularly preferably, the main module comprises sections of the feed conduit as well as of the return conduit.

The at least one load module also comprises a section of the feed conduit with a feed connection, and a section of the return conduit with a return connection. A load circuit is connected onto the feed connection and onto the return connection in the manner described above. Moreover, the at least one load module comprises a regulating (closed-loop control) device for regulating the flow through a load circuit which is connected onto the feed connection and onto the return connection. The regulation of the flow permits a change in operation of the heating installation, for adaptation to the current or present energy requirement of the load circuit. The regulating device can preferably be designed as a motor-operated valve, in particular proportional valve or as a circulation pump. Powered valves which can be powered otherwise, such as thermoelectric powered valves with corresponding time-varied control are to be used. In the case of a valve, the flow regulation or the flow control is achieved by way of changing the opening degree of the valve. In the case of a circulation pump, the flow can be achieved by way of the speed change of the circulation pump. With the use of a valve, this is preferably designed such that it can also be completely closed, in order to completely switch off the load circuit, as is described below.

The regulating device is arranged in the inside of the load module in one of the flow paths in the feed or in the return to the load circuit. I.e. the regulating device can be arranged between the feed connection and the section of the feed conduit or between the return connection and the section of the return conduit, in the flow path in the inside of the load module.

According to the invention, the main module comprises a manifold control device which is provided for the control of the regulating device in the at least one and preferably several load modules. The manifold control device in the main module thus forms a central control device which controls or regulates the regulating devices in the load modules, preferably in all load modules. The central control of the regulating devices has the advantage that interactions between the individual load circuits can be taken into account in the control, and thus the complete installations can be optimally controlled, so that each load circuit is optimally supplied with the necessary quantity of the heat transfer medium. Moreover, this design has the advantage that only one control device needs to be provided for the complete system and the load modules require no complex electronic components, so that the construction of the load modules is simplified and thus the costs for the load modules can be reduced. The described electrical couplings create an electrical connection between the manifold control device in the main module, and the regulating device in the load modules, for their activation. Thereby, preferably a bi-directional communication between the manifold control device and the load modules can be envisaged, via which for example feedbacks from the regulating devices, for example with regard to the opening degree and/or sensor data of sensors additionally arranged in the load modules can be transmitted to the manifold control device.

Preferably, the main module comprises at least one circulation pump assembly which is arranged in the section of the feed conduit or in the section of the return conduit and serves for delivering the fluid or liquid through the heating or cooling circuit, which means in particular through the individual load circuits. Preferably, the mentioned manifold control device likewise serves for the control of this circulation pump assembly. Thus, the manifold control device preferably serves for switching the circulation pump assembly on and off in accordance with requirements, and further preferably also for controlling or regulating the circulation pump assembly in its speed, in order to set a desired delivery power or a desired differential pressure. Sensors additionally suitable for the regulation can be arranged in the circulation pump assembly and/or the main module for this. The manifold control device thus with this embodiment assumes two functions, on the one hand the control or regulation of the regulating devices in the load modules and on the other hand also the control or regulation of the circulation pump assembly in the main module. Thus, only one central control device is required for the control or regulation of the complete system. As described below, the manifold control device can be designed for receiving external sensor data. Thereby, the circulation pump assembly as the case may be can also be controlled or regulated on the basis of such detected sensor data.

According to a particular embodiment of the invention, the manifold control device is integrated into the circulation pump assembly. This means that the necessary electronic components are preferably integrated into the housing of the pump assembly, for example a motor housing or a separate electronics housing of the circulation pump assembly. Such an electronics housing or a terminal box can be applied onto a motor housing of the circulation pump assembly, in which housing an electrical drive motor is arranged. Particularly preferably, the electronics housing is applied onto the axial face end of the motor housing which is away from a pump housing connected to the motor housing. Thus, the necessary electronic components for the control or regulation of the circulation pump assembly and of the regulating devices can be arranged centrally at one location. The arrangement in the circulation pump assembly has the advantage that the necessary electrical connection to the electrical coils of the drive motor of the circulation pump assembly can be integrated directly into this, so that on assembly of the main module, apart from the installation of the pump assembly, preferably no further electronic components are to be assembled or electrically connected. The complete construction is thus simplified. Moreover, microelectronics which are necessary for the control of the circulation pump assembly can also be used to control the regulating devices.

According to a further particular embodiment of the invention, a mixing device can be arranged in the main module. Such a mixing device serves for admixing fluid from the return to the fluid flow in the feed, in order to be able to set the temperature of the fluid in the feed, which is to say the feed temperature. For this, the mixing device is preferably designed such that it creates a connection between the section of the return conduit and the section of the feed conduit in the main module. A suitable mixing regulating device, for example in the form of a regulating valve or a mixing valve is arranged in the main module, in order to be able to set the mixing ratio. Such a control valve or mixing valve can be electromotorically set for example. The mixing regulating device can alternatively also be formed by a pump assembly. According to a particular embodiment of the invention, one envisages the manifold control device likewise assuming the control or regulation of this mixing device, which means that the manifold control device controls or regulates the mixing ratio set by the mixing device. This, for example, can be effected by way of activating a servomotor of the mixing device. Thus, one can make do without a separate mixing control. Rather, the manifold control device forms an integrated control which controls the regulating devices of the load modules, preferably of all load modules and moreover preferably also controls or regulates a mixing device arranged in the main module. Further preferably, the control or regulation of a circulation pump assembly or pump assembly in the main module is also assumed by the manifold control device, as described previously.

Moreover, the main module and the load module comprise mechanical and hydraulic couplings as well as an electrical connection which preferably correspond to one another. These are designed such that they permit a releasable, mechanical, hydraulic and electrical connection between the main module and the load module. The mechanical couplings between the main module and the load module thereby permit a releasable mechanical connection between the load module and the main module, so that these are held on one another or mechanically fixed on one another. The electrical connection can be for example a coupling device or a cable connection.

The hydraulic couplings permit a connection of the flow paths from the load module and main module. Thus, the sections of the feed conduit in the load module and the main module are releasably and sealingly connected to one another via hydraulic couplings, so that they form a continuous feed conduit. Accordingly or alternatively, a section of a return conduit in the main module with a section of the return conduit in the load module can be releasably connected to one another via a hydraulic coupling, so that a continuous return conduit is created between the main module and load module. It is to be understood that the main module comprises at least one section of the feed conduit or a section of the return conduit, wherein this section is accordingly connected to the associated section of the return conduit or to the associated section of the feed conduit in the load module via a hydraulic connection. The main module also preferably comprises a section of the feed conduit as well as a section of the return conduit, which are connected in the described manner via hydraulic couplings to the connecting sections of the feed conduit and of the return conduit in the load module.

The releasable electric coupling which can be designed as a plug-in coupling for example, creates a releasable electrical connection between the main module and the load module. This, in particular, serves for the energy supply of the regulating device in the load module. Preferably, the mechanical as well as the hydraulic and the electrical coupling are designed as plug-in couplings, so that the load module can be stuck onto the main module in a releasable and simple manner, wherein a mechanical connection, the necessary hydraulic connections as well as the necessary electrical connection are simultaneously created. This permits a very simple assembly.

The load module preferably at a first longitudinal end comprises first hydraulic couplings in the form of a first return coupling, which is connected to the section of the return conduit in the inside of the load module, and of a first feed coupling which is connected to the section of the feed conduit in the load module. This first longitudinal end is that longitudinal end, on which the connection to the main module is created, i.e. with which the load module is applied onto a side of the main module.

Preferably, the main module at a side which faces the load module or a longitudinal end which faces the load module comprises hydraulic couplings which comprise a feed coupling and a return coupling and which are designed in a manner such that they can engage with the first hydraulic couplings on the load module. The feed coupling is connected to the section of the feed conduit in the main module, and the return coupling is connected to the described section of the return conduit in the main module. The first feed coupling of the load module comes into connection with the feed coupling on the main module and creates a sealed hydraulic connection which hydraulically connects the section of the feed conduit in the main module to the section of the feed conduit in the load module, when the load module is applied onto the main module. Accordingly, the return coupling on the main module comes into a sealed, fluid-leading connection with the first return coupling on the load module, so that a continuous flow path from the section of the return conduit in the load module to the section of the return conduit in the main module is created. The feed couplings and the return couplings are preferably designed as plug-in couplings and comprise necessary seals for sealing to the outside, for example O-rings which come into bearing contact between two opposite sealing surfaces.

Further preferably, the load module on a second longitudinal end which is opposite the first longitudinal end comprises two hydraulic couplings in the form of a second return coupling which is connected to the section of the return conduit, and of a second feed coupling which is connected to the section of the feed conduit in the inside of the load module, wherein the two hydraulic couplings are arranged and designed in a manner such that they can engage with the first hydraulic couplings of a further load module. This permits several load modules to be rowed onto one another and thereby the creation of hydraulic connections between the load modules. Thereby, in each case a first feed coupling of a load module engages into the second feed coupling of a second load module, whilst simultaneously the first return coupling of the first load module engages into the second return coupling of the second load module. The section of the feed conduit in the inside of the load module thus preferably creates a connection between the first and the second feed coupling of this load module, whereas the section of the return coupling in the inside of the load module hydraulically connects the first and the second return coupling of this load module to one another. In this manner, several load modules can be rowed onto one another in the longitudinal direction, in which the first and the second longitudinal ends are away from one another, in order together to form a hydraulic manifold with exactly the desired number of connections for load circuits, i.e. feed connections and return connections. Simultaneously, the necessary number of regulating devices can be arranged for the desired number of load circuits, since a regulating device is additionally integrated into each load module. The hydraulic manifold according to the invention can thus be adapted by way of simply sticking a desired number of load modules onto one another, in order to be able to supply and regulate a desired number of load circuits. The last load module can be locked on its second longitudinal end by way of a closure module which as the case may be can offer further hydraulic assemblies such as an aspirator.

Further preferably, the manifold control device comprises at least one communication interface for receiving signals from an external control element, in particular a room thermostat. Particularly preferably, this communication interface is designed such that it can communicate with several control elements, i.e. in particular several room thermostats. For example, several load circuits can be provided with several load modules, wherein each load circuit is provided for example for thermally regulating a room in a building. Thereby, preferably a room thermostat is arranged in each of these rooms and detects the current room temperature and communicates with the communication interface of the manifold control device. The control element in the form of a room thermostat can moreover be designed in order to be able to preselect a desired room temperature. With a deviation from the actually detected room temperature from the set setpoint, the room thermostat then sends a signal to the communication interface, that a thermal regulation of the room via the load circuit is necessary. The manifold control device then initiates the switching-on, i.e. the opening of the associated load circuit. For this, the manifold control device activates the regulating device in the associated load module for this load circuit, such that the regulating device opens the load circuit. I.e. for example, a valve is moved from a closed position into an opened position. If a circulation pump is used as a regulating device, then the load circuit is set into operation or switched on by way of switching on the circulation pump. This design thus means that preferably individual control elements or room thermostats do not communicate directly with associated load modules of the hydraulic manifold, but preferably with a central manifold control device which then for its part controls the load modules or the regulating devices arranged in the load modules. The construction is again simplified in this manner, since the complete communication and control can be carried out by the manifold control device.

Particularly preferably, the hydraulic couplings are designed in each case as plug-in couplings with a male coupling part and with a corresponding female coupling part, wherein on coupling, the male coupling part engages into the female coupling part. This design permits the use of a radial seal. Moreover, certain guidance can be given when putting the coupling together by way of the inter-engagement or meshing. It is possible for the hydraulic couplings on the main module to be designed as male coupling parts, and the first hydraulic couplings on the load modules to be designed as female coupling parts, or vice versa. If the load module comprises hydraulic couplings on two opposite sides, on one side it comprises a male coupling part and on the opposite side a corresponding female coupling part in each case. With the arrangement of the return coupling and the feed coupling, it is possible for both to have the same configuration at one side, i.e. both to be designed as a male coupling part or as a female coupling part. It is also possible at one side to design the return coupling for example as a female coupling part and the feed coupling as a male coupling part or vice versa.

The load module preferably at its first longitudinal end comprises at least one first electrical plug-in-contact as part of an electrical coupling, wherein a corresponding second electrical plug-in contact which can be releasably brought into contact with the first plug-in contact of the load module is formed on the main module on a side which faces the load module. The first and the second electrical plug-in contact can be designed as a male and as a female plug-in contact which engage into one another. Alternatively, plug-in contacts which come into contact with one another in another manner can also be applied. The electrical plug-in contacts can be designed in a single-pole or multi-pole manner. They are preferably designed in a multi-pole manner, in order thus to permit an energy supply for the regulating devices and, as the case may be, a data transmission from sensors or further electronic components.

Further preferably, the load module on a second longitudinal end which is opposite the first longitudinal end comprises a second electrical plug-in contact which can be brought into contact with a first electrical plug-in contact on a first longitudinal end of a second load module in a removable manner. This second electrical plug-in contact with regard to its design corresponds to the second electrical plug-in contact on the main module. This permits several load modules to be electrically contacted with one another when rowing these onto one another. Thereby, all load modules can be designed equally and it is possible to apply a load module either onto the main module or in the longitudinal direction onto a preceding load module. Thus, a desired number of load modules can be joined together and combined with one another, in order to connect and supply the desired number of load circuits.

Further preferably, the first and the second electrical plug-in contact are connected to one another electrically, in particular in the manner of a data bus, in the at least one load module. This design permits the electrical connection of several load modules in series or for them to be joined onto one another, wherein an energy supply and/or a data transmission through the joined-together load modules to the subsequent load modules is possible. A data bus has the advantage that it permits a multitude of load modules to be combined with one another or joined onto one another, without the number of necessary conductors in the electrical connections being increased by way of this. Moreover, all load modules can be designed identically and joined onto one another in an infinite sequence.

The load modules preferably comprise a communication unit which assumes the communication with the manifold control device. Thereby, the communication unit and the manifold control device are preferably designed such that these automatically couple. I.e. both exchange addresses with one another and create a communication connection, so that each load module can be unambiguously addressed by the manifold control device. For this, each load module can have a fixed, individual address. Preferably however, the manifold control device recognizes when a new load module is directly connected to the main module or to a load module which is already stuck on the main module. The manifold control device for this is designed such that it then gives an address to the newly connected load module or to its communication unit, so that this load module and its communication unit can then be unambiguously addressed, in order to be able to control the regulating device in the associated load module via the communication units. Accordingly, a data exchange from sensors in the load module to the manifold control device can be effected via the communication unit. The communication is thereby preferably effected via an electrical data bus. However, a communication via an optical signal connection or for example via a radio connection is conceivable. Separate electrical leads can be used for the data bus. Alternatively, the communication can also be effected via the electrical leads serving for the energy supply of the regulating devices.

According to a further preferred embodiment, the regulating device in the load module is connected to the first electrical plug-in contact for the energy supply. Thus, the regulating device is supplied with energy via the plug-in contact. This can be effected in a direct manner or via an intermediately connected control element or intermediately connected communication unit which receives control signals via the data bus. The control unit or communication unit then creates the connection to the energy supply for the targeted activation of the regulating device.

Particularly preferably, the at least one load module comprises an electronic module control device which is electrically connected to the first plug-in contact and the regulating device, and is designed for communication with the manifold control device in the main module as well as for activating the regulating device. The module control device thus assumes the function of the previously described communication unit or of the described control unit. It preferably serves for the unambiguous addressing of the load module and the activation of the regulating device in the load module by the manifold control device.

Thereby, the module control device of the at least one load module, and the manifold control device are preferably connected to one another via a data bus and preferably designed for the automatic communication coupling. The data bus is preferably an electrical data bus, via which the plug-in contacts are connected to one another. I.e. the data bus runs from the first to the second described plug-in contact, in the respective load module. The automatic communication coupling can be effected in the manner described above, for example by way of receiving an address from the manifold control device. This permits the modules to be simply joined together and for the communication coupling to be effected in a largely automatic manner. As the case may be, actuation elements can be arranged on the load modules and/or on the main module, via which a user can manually start the coupling procedure.

According to a further preferred embodiment, at least one temperature sensor is arranged in the load module in a manner such that it detects the temperature of a fluid flowing through the return connection, wherein the temperature sensor is preferably signal-connected to the manifold control device. This signal connection can likewise be effected via a module control device or a communication unit. In particular, the data transmission is likewise effected via the described data bus. The detection of the temperature in the return of the load circuit is advantageous for the regulation of the respective load circuit, wherein the regulation is preferably assumed centrally by the manifold control device in the main module, for all load circuits.

Usefully, the at least one load module at a first longitudinal end comprises at least one mechanical coupling, and the main module at a side facing the load module comprises at least one second mechanical coupling which is releasably connectable to the first mechanical coupling. This can be a plug-in coupling. The releasable coupling can preferably be effected via releasable catch and/or clamping elements or additional securing elements such as securing clips or securing pins which are applied into the coupling after the connection of the load module and the main module has been effected. Preferably, the coupling is designed such that it can be joined together and separated again without any special tool. The mechanical couplings ensure that the load module is held on the main module and/or that the main module is held on the load module. This prevents all load modules and the main module having to be individually fastened on a separate support or carrier structure. Further preferably, all load modules and the main module comprise fastening means which permit a fastening on an external carrier structure, for example on a wall. Thereby, it is preferable if not all fastening means have to be used for the fastening, since for example a load module is connected to the main module in a preferably supporting manner via the mechanical couplings.

Further preferably, the at least one load module at a second longitudinal end comprises at least one second mechanical coupling which is releasably connectable to a first mechanical coupling at a first longitudinal end of a second load module. Thereby, the second mechanical coupling is preferably designed identically to the mechanical coupling on the main module. Thus, all load modules can be designed equally and either be mechanically connected to the main module or to an adjacent load module.

The mechanical couplings between the main module and an adjacent load module or between individual load modules moreover ensure that the described hydraulic and electric couplings are held securely in engagement.

According to a further preferred embodiment, at least that part of the load module, in which the section of the feed conduit, the section of the return conduit, as well as the return connection and the feed connection are situated, is designed as a single-piece component preferably of a plastic. Such a component can be manufactured inexpensively with the injection moulding method. Preferably, only the electrical or electronic components, the regulating devices, in particular in the form of regulating valves, as well as seals are inserted into such a component manufactured as one piece. Particularly preferably, the mechanical couplings as well as the hydraulic couplings and also the supporting/carrying elements of the electrical couplings are likewise also manufactured as one piece with the described parts of the load module, preferably of plastic. With regard to the main module, preferably that part which engages with an adjacent load element, i.e. which carries the electrical, hydraulic and mechanical couplings, is manufactured as one piece of plastic. Particularly preferably, these parts are manufactured as one piece with a pump housing for a circulation pump arranged in a hydraulic manifold.

Further it is possible to combine several hydraulic manifolds according to the preceding invention with one another. Thus, for example, a first hydraulic manifold with a main module and several load modules can be provided as a first arrangement and at least a further arrangement of several load modules can be designed, which is spatially spaced and connected with the first arrangement via suitable pipings. An electrical connection can thereby occur via a connection cable. Alternatively, a suitable energy supply and a communication module can be provided for a second arrangement of load modules for a wireless communication with a manifold control device in the main module. Also it is possible to design a mixing module on the input side in the second arrangement of load modules via which a temperature setting of the feed temperature for the second arrangement of the second load module is independently possible apart from the feed temperature for the first arrangement of load modules. Thereby, also the mixing module is preferably controlled from the manifold control device in the main module.

The invention is hereinafter described in more detail by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a perspective view of the hydraulic manifold with the main module according to FIG. 3 and the load module according to FIG. 4;

DESCRIPTION OF THE PREFERRED EMBODIMENTS

Figure 1:
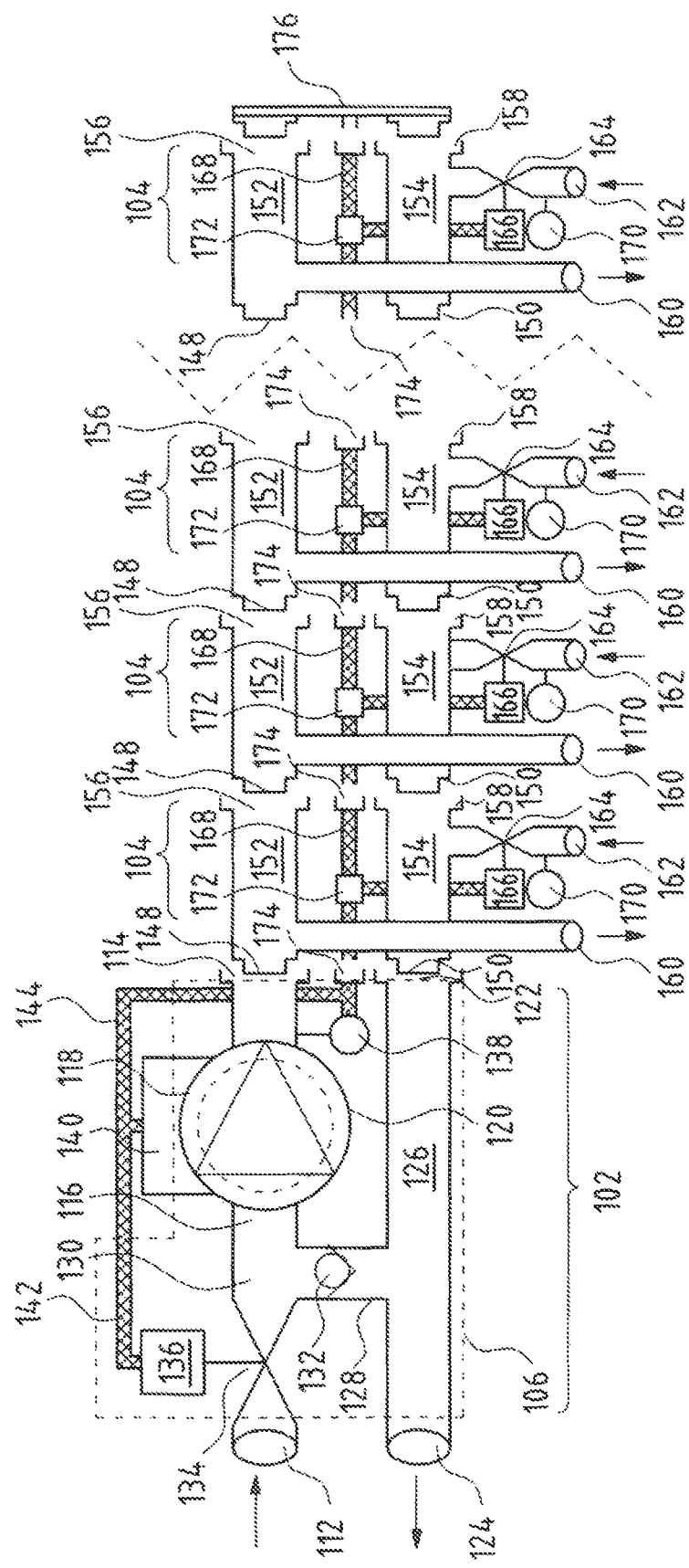
FIG. 1 is a schematic view of a hydraulic manifold according to the invention, in the non-assembled condition.
Figure 2:
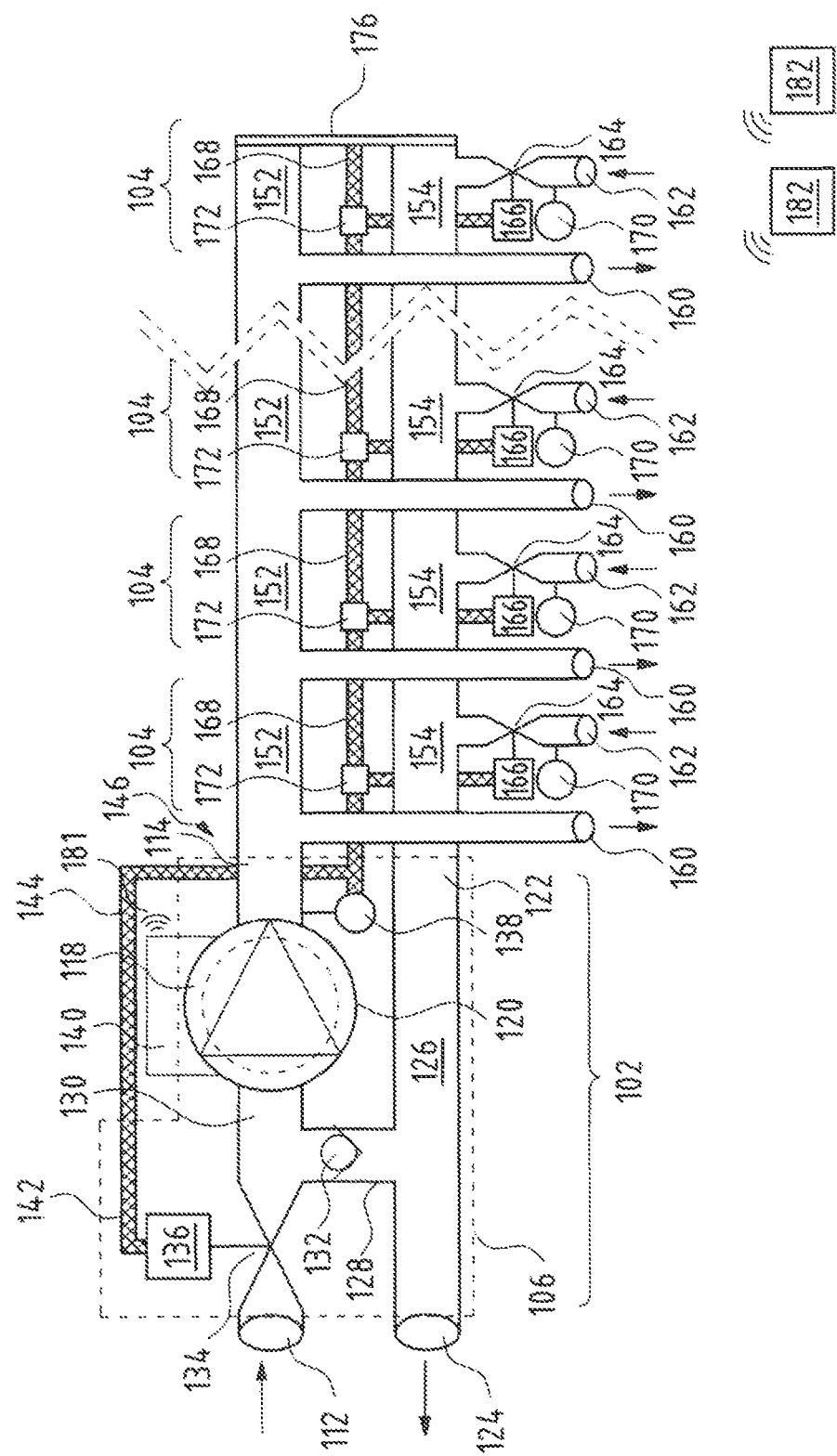
FIG. 2 is a schematic view of the hydraulic manifold according to FIG. 1, in the assembled condition.
Figure 4:
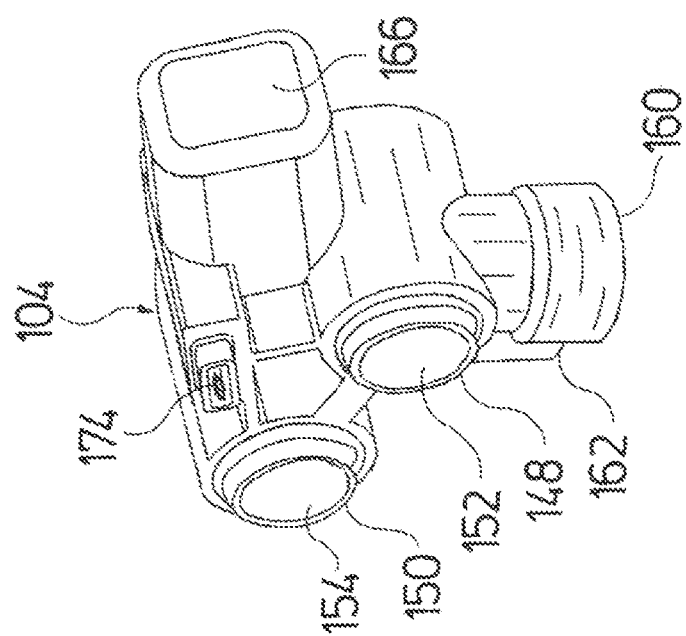
FIG. 4 is a perspective view of a load module of the hydraulic manifold according to the invention.
Figure 3:
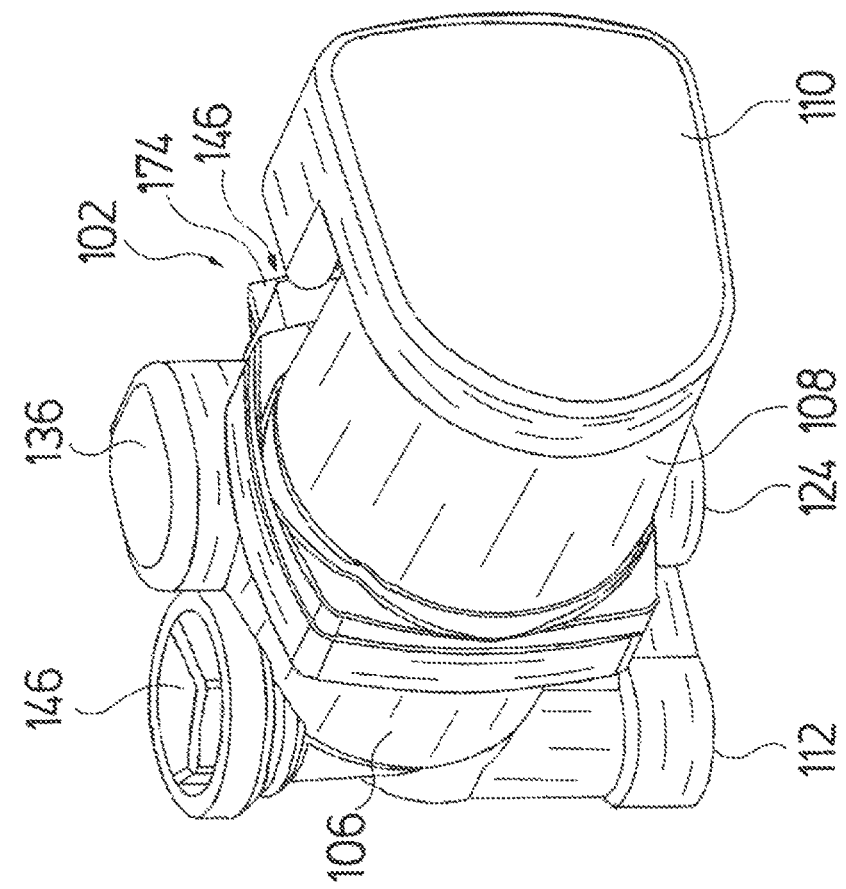
FIG. 3 is a perspective view of a main module of the hydraulic manifold according to the invention.
Figure 6:
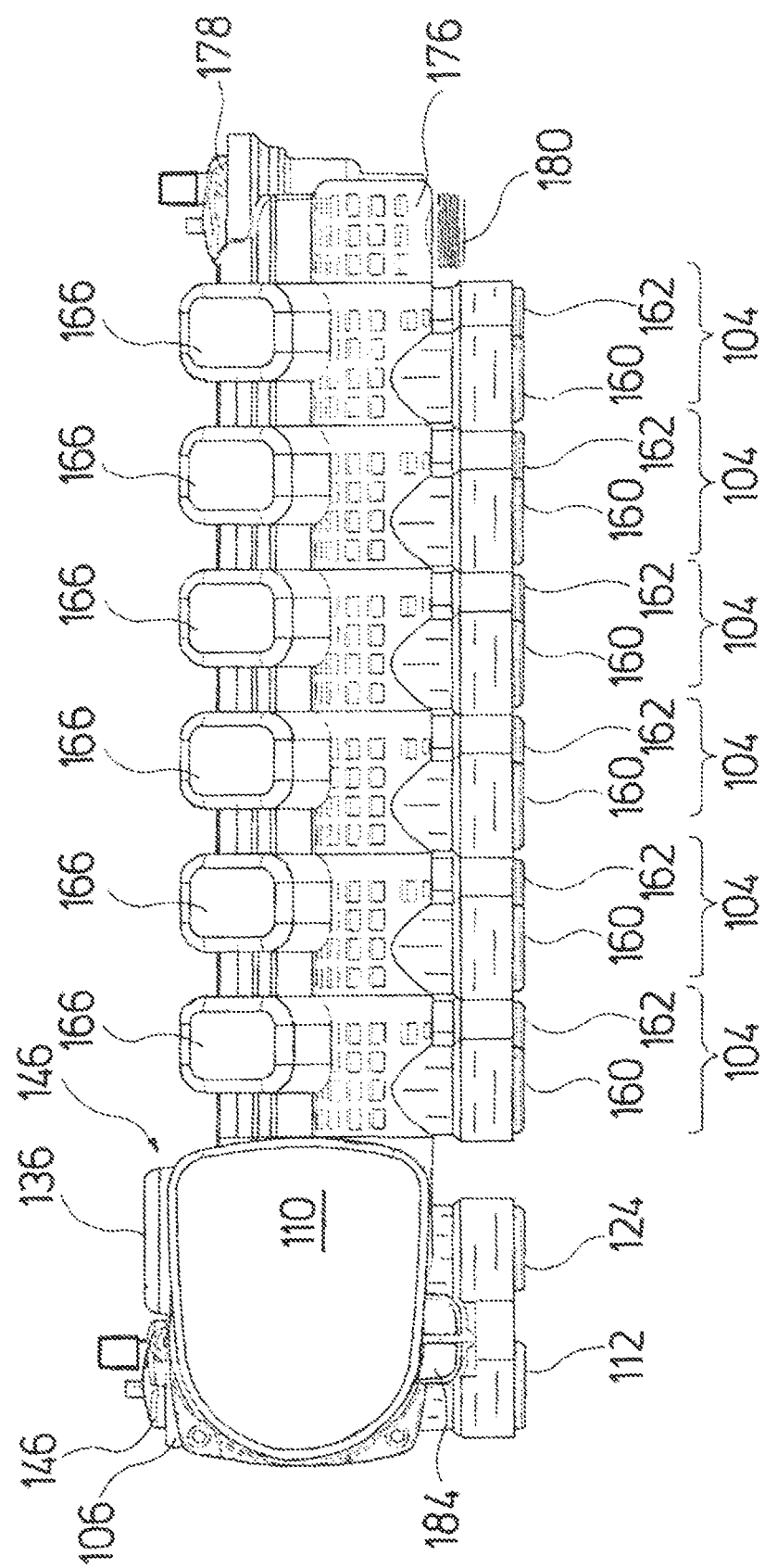
FIG. 6 is a plan view of the hydraulic manifold according to FIG. 5.

The hydraulic manifold shown in the FIGS. 1-6 is constructed in a modular manner and consists of essentially of two types of modules, of a main module 102 as well as of several load modules 104. The main module 102 is formed essentially by a pump assembly. As is shown in FIG. 3, the pump assembly comprises a pump housing 106 with a stator housing 108 which is arranged thereon. The necessary flow paths as well as a receiving space 120 for an impeller 118 are formed in the pump housing 106. The impeller 118 is driven by an electrical drive motor which is arranged in the motor housing or stator housing 108. Thereby, the electrical drive motor is preferably designed as a wet-running motor. An electronics housing 110, in which amongst other things the electronic components for the control or regulation of the electrical drive motor in the stator housing 108 are accommodated, is arranged on the outer side of the stator housing 108 at the axial end.

The circulation pump assembly shown in FIG. 3 forms the main module 102. With this circulation pump assembly, apart from the impeller, the components of a mixing device, whose function is described by way of FIGS. 1 and 2, are accommodated in the pump housing 106, next to the impeller. The pump housing comprises a first inlet 112 as well as a first outlet 114. The circulation pump with the impeller 118 lies in a first flow path 116 between the first inlet 112 and the first outlet 114. The impeller 118 lies in a receiving space 120 in the inside of the pump housing 106 which is schematically represented in the FIGS. 1 and 2 as a dashed line. The impeller 118, driven by the drive motor, delivers a fluid functioning as a heat transfer medium, i.e. a liquid, from the first inlet 112 to the first outlet 114.

The pump housing 106 moreover comprises a second inlet 122 as well as a second outlet 124. The second inlet 122 is connected to the second outlet 124 via a channel 126 which forms a flow path in the inside of the pump housing 106. The channel 126 does not lead through the impeller 118, but extends separately in the pump housing 106. The channel 126 is connected via a connection 128 to a mixing region or mixing point 130 in the flow path 116. The fluid flows from the first inlet 112 and the second inlet 122 are mixed at the mixing point 130. Since the impeller 118 is situated downstream of the mixing point 130, it sucks fluid from the first inlet 112 as well as from the channel 126 via the connection 128 and thus from the second inlet 122. A check valve 132 is arranged in the connection 128 and permits a flow only in the direction from the channel 126 to the mixing point 130.

A regulating valve 134 is arranged in the flow path from the first inlet 112 to the mixing point 130. This is settable in its opening degree via an electrical drive motor 136. The regulating valve 134 functions as a mixing valve, in order to be able to set the mixing ratio of the two mentioned flows at the mixing point 130. No flow can be effected from the first inlet 112 to the mixing point 130 if the regulating valve 134 is closed, and the circulation pump via its impeller 118 sucks fluid exclusively via the second inlet 122 through the channel 126 and the connection 128. If the regulating valve 134 is opened, a part of the flow through the pump assembly is sucked through the first inlet 112, so that a flow from the first inlet 112 is mixed with a flow from the second inlet 122, in the mixing point 130. The mixing ratio changes depending on the opening degree of the regulating valve 134. If now the first inlet 112 is connected to a feed of a heating system, through which hot fluid is fed, and the second inlet 122 is connected to a return of at least one load circuit, colder fluid is then fed through the second inlet 122 and admixed. Thus, by way of admixing the colder fluid from the second inlet 122 to the warmer fluid from the first inlet 112, it is thus possible to reduce the feed temperature of the fluid exiting from the first outlet 114 downstream of the mixing point 130, with respect to the temperature of the fluid entering into the first inlet 112. The actually reached feed temperature at the first outlet 114 is detected via a temperature sensor 138 which is likewise integrated into the circulation pump assembly or its pump housing 106. It is to be understood that the regulating valve 134 could also be arranged in a corresponding manner between the second outlet 124 and the branching of the connection 128 from the channel 126, instead of in the flow path between the first inlet 112 and the mixing point 130.

In the case that the shown hydraulic manifold is used for a cooling system, a cold fluid can be fed through the first inlet 112, whilst warmer fluid is fed via the second inlet 122 from the return of the load circuit. Thus, by way of the admixing of this warmer fluid at the mixing point 130, it is possible to increase the feed temperature of the fed cold fluid. Here too, the temperature can be set to the desired temperature by way of setting the mixing ratio.

The regulation or control of this mixing device, i.e. the temperature regulation, is assumed by a control device 140 which is arranged in the electronics housing 110 of the circulation pump assembly 102. The control device 140 activates the motor 136 of the regulating valve 134 such that this assumes an opening degree which is set by the control device 140. For this, the motor 136 of the regulating valve 134 is connected to the control device 140 via a signal connection 142 which can be designed for example as a data bus. The temperature sensor 138 is also connected to the control device 140 via a signal connection 144. Thus, the control device 140 by way of setting the regulating valve 134 can regulate the admixing of the fluid from the return at the mixing point 130 and thus set a desired feed temperature, wherein a corresponding feedback to control device 140 is effected via the temperature sensor 138, and this permits a temperature regulation.

All the described hydraulic components of the mixing device which are shown in the FIGS. 1 and 2, as well as the impeller 118 of the circulation pump assembly are arranged in the pump housing 106. The pump housing 106 with all its parts, in which the described flow paths are formed, is preferably manufactured as one piece of plastic. Thus, a very simple connection between the described mixing device and the components of the circulation pump can be achieved, since all components are integrated into a single-piece housing 106. A very compact construction with as simultaneously simple assembly is achieved by way of this. Additionally, a bleed valve 146 which is not shown in the FIGS. 1 and 2, is arranged in the pump housing 106.

The previously described mixing device in the example of a hydraulic manifold which is shown here, serves as a mixing device for a floor heating. The hydraulic manifold is designed as a manifold for a floor heating installation. The mixing device thus serves for reducing the temperature of a heating medium to the temperature necessary for the floor heating. This is effected by way admixing the colder fluid from the return, as has been previously described.

The hydraulic manifold shown here, which is provided for use as a manifold for a floor heating system, is moreover constructed in a modular manner. The first outlet 114 and also the second inlet 122 are designed as hydraulic couplings at one side 146 of the main module 102, i.e. of the circulation pump assembly 102, into which couplings a feed coupling 148 as well as a return coupling 150 of the load module 104 arranged adjacently the main module 102 engage. A section of a feed conduit 152 and also a section of the return conduit 154 are formed in the load module 104. The section of the feed conduit 152 connects the first feed coupling 148 to a second feed coupling 156 which is situated at the opposite longitudinal end of the load module 104. Accordingly, the section of the return conduit 154 connects the first return coupling 150 to a second return coupling 158 situated at the opposite longitudinal end of the load module 104. The first feed coupling 148 as well as the first return conduit 150 are designed as male coupling parts which can engage into the second feed coupling 156 as well as second return coupling 158 which are designed as a female coupling parts, of an adjacent load module 104, in order to form a fluid-leading connection between sections 152 of the feed conduit which are adjacent one another, as well as sections of the return conduit 154 which are adjacent one another. The first outlet 114 on the main module 102 in a manner corresponding to the second feed coupling 156 is designed as a female coupling, so that the first feed coupling 148 of the adjacent load module 104 can come into fluid-leading connection with the first outlet 114. Accordingly, the second inlet 122 is likewise designed as a female hydraulic coupling, whose design corresponds to that of the second return coupling 158, so that the first return coupling 150 of the adjacent load module 104 can engage with the second inlet 122 for creating a hydraulic connection.

The section of the feed conduit 152 of each load module comprises a feed connection 160. Moreover, in each load module, the section of the return conduit 154 comprises a return connection 162. The entry of a load circuit is connected on the feed connection 160 of each load module 104, and the exit of the associated load circuit is connected onto the return connection 162 of each load module 104. The load circuits here in each case form individual circuits of a floor heating installation, wherein each circuit preferably heats one room.

Moreover, a regulating valve 164 is arranged in each load module 104, between the return connection 162 and the section of the return conduit 154 in the flow path. Each regulating valve 162 comprises an electric drive motor 166, by way of which the associated regulating valve 164 is adjustable in its opening degree. The regulating valves 164 are moreover designed such that they can be completely closed. By way of this complete closure, it is possible to interrupt or switch off the connected load circuit. If the regulating valve 164 is opened, the flow or the volume flow through the load circuit connected to the feed connection 160 or to the return connection 162 can be regulated by way of changing the opening degree via the drive motor 166. The flow can be varied and be adapted to the respective operating condition, in particular to the energy requirement of the load circuit, for each load circuit on operation of the installation, since such a regulating device with a regulating valve 164 is arranged in each load module. The drive motors 166 are connected to the control device 140 functioning as a manifold control device, via an electric connection 168 in each load module 104, said electric connection serving for the energy supply and for data transmission. Moreover, a temperature sensor 170 is arranged in each case in the load modules 104, in the flow path between the return connection 152 and the section 154 of the return conduit. The temperature sensor 170 detects the return temperature at the exit of the connected load circuit. The temperature sensors 170 are in each case likewise connected to the electric connection 168 which comprises or forms a data bus.

The load modules 104 each have a module control device 172 for the data transmission or communication with the control device 140. The module control devices 172 permit an addressing of the individual load modules 104 by the control device 140. The control device 140 and the module control device 172 are preferably designed for automatic coupling. Thus the control device 140 preferably assigns an address to the module control devices 172 and thus to the associated load module 104, so that the control device 140 on the one hand can detect data from the respective load module 104, for example temperature values from the temperature sensor 170, in a targeted manner and simultaneously activate the drive motor 166 for setting the regulating valve 164, in a targeted manner. The flow through the connected load circuit is preferably set by the control device 140 via the regulating valve 164 in dependence on the temperature difference between the temperature sensors 138 and 170, for each load module 104, so that the temperature difference assumes a constant predefined value. Electrical plug-in couplings 174 are provided between the individual load modules 104, for creating the electrical connection or a data connection between the individual load modules 104. For this, corresponding parts of the electrical plug-in couplings 174 are provided on opposite longitude ends of the load modules 104 which in each case can engage with the electrical plug-in coupling 174 of an adjacent load module 104. Accordingly, an electrical plug-in coupling 174 is present between the main module 102 and the adjacent load module 104.

It is possible to connect a desired number of load modules 104 to the main module 102, depending on how many load circuits are to be connected, due to the design of the electrical and hydraulic couplings between the load modules 104 as well as between the load module 104 and the main module 102. Thus, a flexible adaptation to different heating or cooling systems is possible and it is not necessary to keep available premanufactured manifolds in each case for certain numbers of load circuits. In contrast, a hydraulic manifold of the desired size can be constructed in a very simple manner by way of putting together the corresponding number of load modules 104, as is shown in FIG. 2. The last load module 104 which is away from the main module 102 is thereby closed off by way of an end-piece 176, at its free end i.e. its end which is away from the last adjacent load module 104. The end-piece 176 in particular serves for the closure of the second feed coupling 156 as well as of the second return coupling 158 at the end, so that the section of the feed conduit 152 and the section of the return conduit 154 at the free end are sealed to the outside. In the example shown in FIG. 6, the end-piece 176 moreover yet has a bleed valve 178 as well as a connection 180 which is connected to the return conduit 154 and for example can be used for filling or rinsing. This connection 180 is closed in normal operation. Six load modules 104 for six load circuits are joined onto the main module 102 in the examples shown in the FIGS. 5 and 6.

A mechanical connection between the load modules 104 as well as between the first load module 104 and the main load module 102 is created, apart from the described hydraulic and electric connections. The mechanical connection in this example is created by way of engagement of the hydraulic couplings into one another, i.e. of the first feed coupling 148 with the second feed coupling 156 as well as of the first return coupling 150 with the second return coupling 158. However, it is to be understood that here additionally locking or securing elements can be provided, in order to create a fixed mechanical connection between the individual modules 102, 104.

If the modules 102, 104 are joined onto one another, the sections of the feed conduit 152 of the individual load modules 104, as is to be seen in FIG. 2, form a continuous feed conduit 152 whilst the sections of the return conduit 154 form a continuous return conduit 154. The control device 140 forms a central manifold control device which controls or regulates the circulation pump, i.e. its drive motor 108, in particular carries out a speed control or regulation for the drive motor 108, as well as regulates the mixing device by way of activating the regulating valve 134. Moreover, the control device 140 here serves as a central control device for the regulating valves 154 in all load circuits 104. In this, as is described above, it effects a flow regulation and thus serves for switching the individual load circuits on and off. For this, the control device 140 comprises a communication interface or a communication device 181 which permits a communication with external room thermostats 182, in this example via radio. Only two room thermostats 182 are shown in FIG. 2. It is however to be understood that preferably a room thermostat 182 is provided for each room to be thermally regulated. A desired room temperature can be set at the room thermostat 182. If the actual room temperature differs from the set setpoint, the room thermostat 182 sends a signal to the communication interface 181 of the control device 140 which thereupon initiates the switching-on of a load circuit associated with the room thermostat 182, by way of opening the associated regulating valve 164. If a desired room temperature is achieved, then the room thermostat 182 in turn sends a signal, whereupon the control device 140 via the drive motor 166 closes the regulating valve 164 associated with this load circuit, and thus switches off the load circuit which leads through the associated room.

Moreover, an electrical connection 184 is formed on the electronics housing 110 and serves for the electric connection of the complete hydraulic manifold and all its electrical components. The electrical connection 184 is designed here as a plug, on which a mains lead can be connected. Preferably, a mains part is integrated in the electronics housing 110 and only small voltages are transmitted via the electrical connections 168 to the load modules 104.

The shown hydraulic manifold which is shown in FIGS. 7 to 13 as a second embodiment example is constructed in a modular manner. It comprises a main module 202 as well as several load modules 204. The main module 202 serves for the hydraulic and electrical connection of the load modules 204 and comprises a control device 206 which serves as a manifold control device for the control of the several load modules 204. The main module 202 moreover comprises a feed connection 208 as well as a return connection 210. The main module 202 with the feed connection 208 and the return connection 210 is connected onto a heating or cooling installation. Thereby, thermally regulated fluid is fed through the feed connection 208 and after flowing through one or more load circuits the fluid flows through the return connection 210 back into the heating or cooling installation. In the main module 202, in each case a temperature sensor which detects the feed temperature and return temperature can be arranged on the section of the feed conduit 212 and/or on the section of the return conduit 216. These sensors can be signal-connected to the manifold control device 206. Thus, the manifold control device 206 can directly detect the temperatures in the main module.

According to FIGS. 7 to 13 the hydraulic manifold is hereinafter described by way of the example of a heating installation. However, it is to be understood that the hydraulic manifold accordingly could also be applied in a cooling installation, or in a combined heating and cooling installation. In a heating installation, heated fluid, in particular heated water, for example from a boiler or a heat reservoir, is fed to the feed connection 208. The fluid, after flowing through the heat exchanger in the rooms or buildings to be heated, flows back through the return connection 210 to the boiler or heat reservoir.

The feed connection 208 in the inside of the main module 202 is connected to an outlet 214 by way of a section of the feed conduit 212. Accordingly, the return connection 210 is connected via a section of a return conduit 216 in the inside of the main module 202 to an inlet 218. The outlet 214 and the inlet 218 are designed as hydraulic couplings on a side of the main module 202 which faces an adjacent load module 204. The load modules 204 in their inside likewise comprise a section of a feed conduit 212 and a section of a return conduit 216. The sections of the feed conduit 212 as well as of the return conduit 216 extend in the longitudinal direction through the load modules 204. At a first side, the sections of the feed conduit 212 and of the return conduit 216 are connected to first hydraulic couplings. Thereby, the section of the feed conduit 212 at the first end is connected to the first feed coupling 220, and the section of the return conduit 216 on the same side is connected to a first return coupling 222. The first feed coupling 220 is engaged with the outlet 214 of the main module 202, whereas the first return coupling 222 is in engagement with the inlet 218 of the main module 202, in order to create a fluid-leading connection.

The load modules 204 at a longitudinal end which is opposite the first feed coupling and at the longitudinal end which is opposite the first return coupling 222 comprise a second feed coupling 224 as well as a second return coupling 226. The second feed coupling 224 forms the axial end of the section of the feed conduit 212 in the load module 204, said axial end being opposite to the first feed coupling 220, whereas the second return coupling 226 forms the axial end of the section of the return conduit 216 in the load module 204, said axial end being opposite to the first return coupling 222. The several load modules 204 are all designed the same. This means that the design and arrangement of the second feed coupling 224 as well as of the second return coupling 226 in its design corresponds to the arrangement of the outlet 214 as well as of the inlet 218, on the main module 202. Thus, it is possible to apply a load module 204 either onto the main module 202 or onto another load module. Thus, several load modules can be rowed onto one another in the longitudinal direction. An arrangement of two load modules 204 is shown in FIG. 1, wherein further load modules 204 are indicated schematically. Six load modules 204 are arranged on a main module 202 in the embodiment example according to FIGS. 2 and 3.

The essential feature of the load modules 204 which are shown in the arrangements according to FIGS. 7 to 13 is moreover the fact that each load module 204 comprises an integrated mixing device for the temperature setting of the feed temperature for an associated load circuit 228. The mixing device, in a flow path from the feed conduit 212 to the entry 229 of the load circuit 228 comprises a regulating valve 230 and a circulation pump 232 downstream of this valve. The circulation pump 232 serves for delivering fluid from the feed conduit 212 through the load circuit 228 and via the return 234 back into the return conduit 216. The mixing device moreover comprises a connection from the return 234 to a mixing point 236, wherein the mixing point 236 is situated in the flow path between the regulating valve 230 and the circulation pump 232. A check valve 238 is situated in the connection 235 and has the effect that a flow through the connection 235 is possible only in the direction from the return 234 to the mixing point 236.

The regulating valve 230 is signal-connected to the manifold control device 206 for its activation. I.e. the manifold control device 206 activates the regulating valve 230, in order to set a desired feed temperature at the entry 229 of the load circuit 228. This feed temperature at the entry 229 is detected by a temperature sensor 240. If the regulating valve 230 is completely closed, the circulation pump 232 delivers fluid exclusively via the connection 235 in the circuit through the load circuit 228. If the regulating valve 230 is opened, simultaneously a fluid flow is sucked out of the feed conduit 212, and a fluid flow is sucked out of the connection 235, by the circulation pump 232. Thereby, the fluid from the return 234 is thus admixed via the connection 235 to the fluid from the feed conduit 212, so that the feed temperature of the fluid from the feed conduit 212 is changed. In the case of a heating system, the feed temperature in the feed conduit 212 is usually greater than in the return 234, i.e. in this case colder fluid from the return 234 is admixed via the connection 235 to the flow from the feed conduit 212, so that the feed temperature is lowered. Vice versa, in a cooling system, the feed temperature of the fluid from the feed conduit 212 can be increased by way of admixing warmer fluid from the return 235. The share of fluid which is fed from the feed conduit 212 to the mixing point 236 can be varied by way of changing the opening degree of the regulating valve 230. Accordingly, a greater or smaller share of the delivery flow is sucked via the connection 235, given a constant delivery rate of the circulation pump 232, by which means the temperature of the fluid at the entry 229 of the load circuit 228 can be changed by way of changing the mixing ratio of the two flows at the mixing point 236. The actually set temperature thereby is detected by the temperature sensor 240. The detected temperature value is communicated to the manifold control device 206 for regulation, via a suitable signal connection. The manifold control device 206 in this manner regulates the individual load modules 204 in an independent manner, so that the feed temperature for the individual load circuits 228 can be individually regulated or set.

Moreover, in this embodiment example, a second temperature sensor 242 is arranged at the exit of the load circuit 248. This too, is preferably signal-connected to the manifold control device 206 and detects the exit temperature out of the load circuit 228. It is possible to determine the temperature difference across the load circuit 228 and for example to regulate the volume flow delivered by the circulation pump 232 in a manner depending on this temperature difference, due to the fact that the entry temperature and the exit temperature of the load circuit 228 are detected. For this, preferably the circulation pump 232 is also activated by the control device 206 via a suitable signal-connection, in particular in order to set the speed of the circulation pump 232. The flow can be set individually for each load module by way of a speed change of the respective circulation pump 232.

Figure 7:
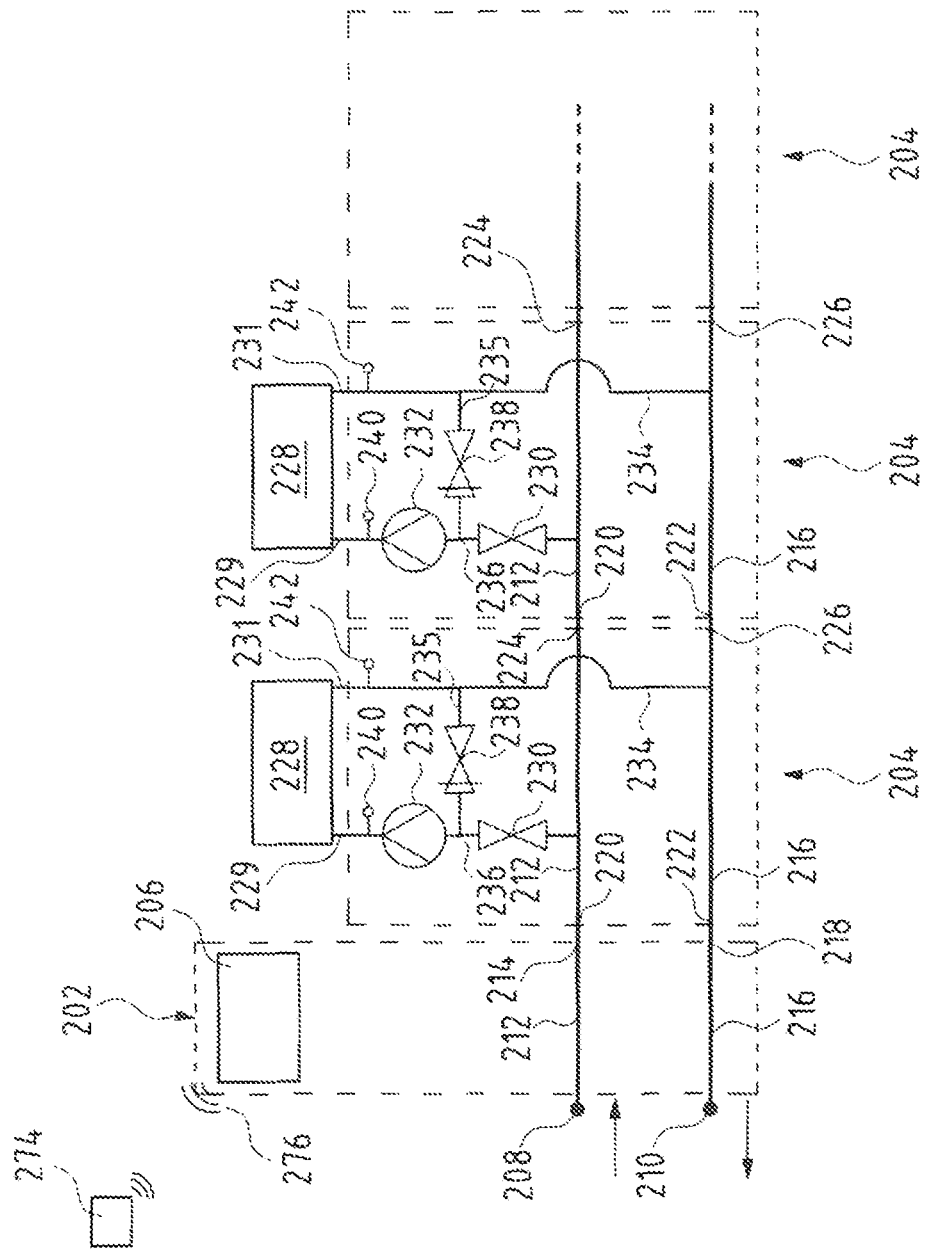
FIG. 7 is a schematic view of a hydraulic manifold according to the invention.

The design construction of the hydraulic manifold described by way of FIG. 7 is described in more detail by way of FIGS. 8 to 13. The main module 202 comprises a hydraulic section 250 as well as an electronics housing 252, in which the control device or manifold control device 206, and, as the case may be, further components for the energy supply, for example a mains part, are arranged. The hydraulic section 250 is preferably designed as a single-piece component of plastic and comprises the feed connection 208 as well as the return connection 210 on one side. The feed connection 208 and also the return connection 210 are designed as hydraulic couplings for the connection of supply conduits, which create the connection to a heating installation or cooling installation. The inlet 218 as well as the outlet 214 is arranged on a second side surface of the hydraulic section 250. The outlet 214 is connected to the feed connection 208 via a channel in the inside of the hydraulic section 250, whereas the inlet 218 is connected to the return connection 210 via a further channel in the inside of the hydraulic section 250. As is described above the outlet 214 and the inlet 218 are designed as hydraulic couplings for the pluggable connection of a load module 204. For this, the first feed coupling 220 of an adjacent load module 204 engages into the outlet 214, and a first return coupling 220 of an adjacent load module engages into the inlet 218. The outlet 214 and the inlet 218 in this example are in each case designed as a female part of a plug-in coupling. Accordingly, the first feed coupling 220 and the first return coupling 222 are in each case designed as male parts of a hydraulic plug-in coupling. A mechanical connection between the main module 202 and the load module 204 is created by way of sticking the couplings into one another. Seals, in particular O-rings which are not shown in more detail here are arranged in the couplings.

The load module 204 also comprises a housing part which is manufactured as one piece of plastic and which serves as a pump housing for the circulation pump 232 and in its inside comprises the necessary flow paths and in particular the sections of the feed conduit 212 as well as of the return conduit 216. The drive of the regulating valve 230 as well as the stator housing 256 of the circulation pump 232 projects out of the housing part 254. The housing part 254 on a longitudinal end comprises the first feed coupling 220 and the return coupling 222, and at an opposite longitudinal end the second feed coupling 224 as well as the second return coupling 226, wherein the second feed coupling 224 and the second return coupling 226 in a manner corresponding to the outlet 214 and the inlet 218 on the main module 202 are formed as female parts of a hydraulic plug-in coupling. It is possible to stick identically designed load modules 204 either directly onto the main module 202 or onto a further load module 204, since the second feed coupling 224 and the second return coupling 226 are shaped and arranged in a manner corresponding to the outlet 214 and the inlet 218, wherein then the first feed coupling 220 of a second load module engages into the second feed coupling 224 of a first load module, and the first return coupling 222 of a second load module engages into the second return coupling 226 of a first load module. Thus, several load modules can be stuck onto one another, in order to form a hydraulic manifold with the desired number of connections for load circuits 228. The number of the load modules 204 is thereby essentially limited by the configuration of the control device 206. The housing part 254 of the load module 204 moreover comprises a feed connection 258 and a return connection 260. Accordingly, the entry 229 of a load circuit 228 is connected to the feed connection 258, whereas an exit 231 of the load circuit 228 is connected to the return connection 260.

Figure 8:
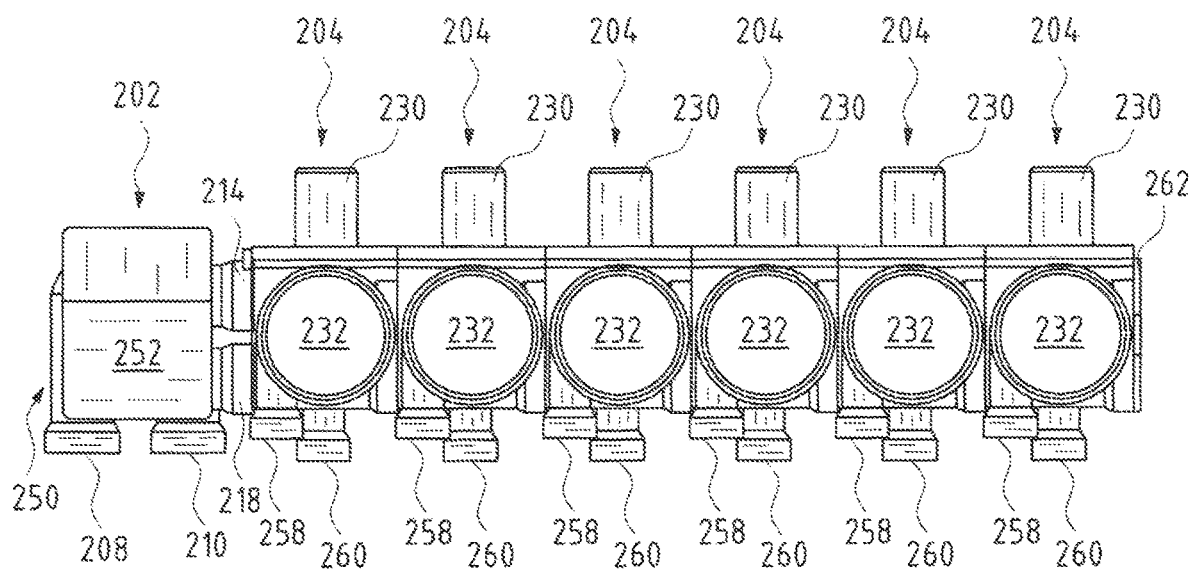
FIG. 8 is a plan view of a hydraulic manifold according to the invention.
Figure 9:
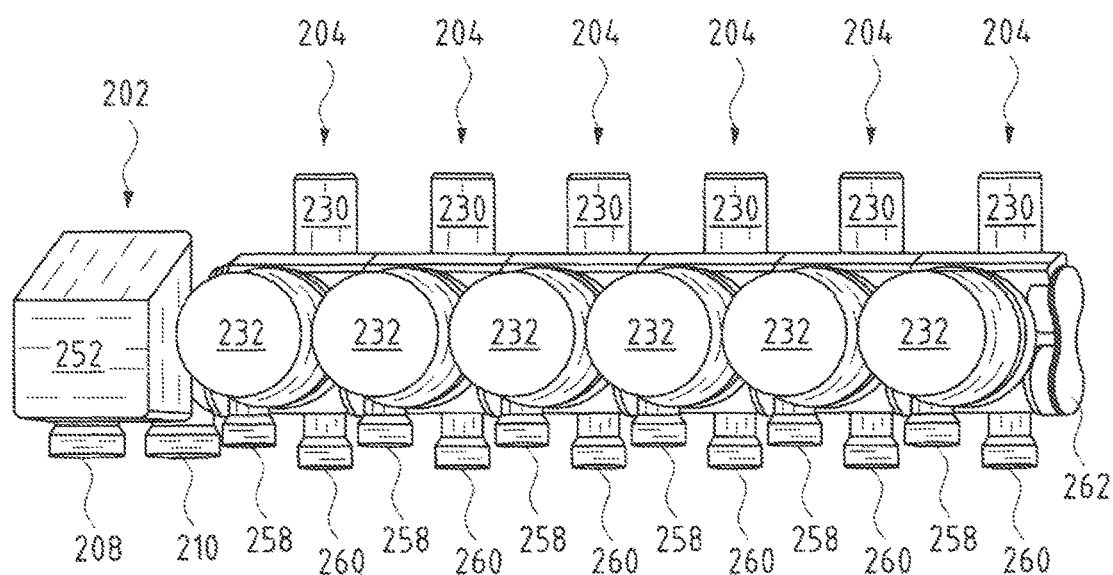
FIG. 9 is a perspective view of the hydraulic manifold according to FIG. 2.
Figure 11:
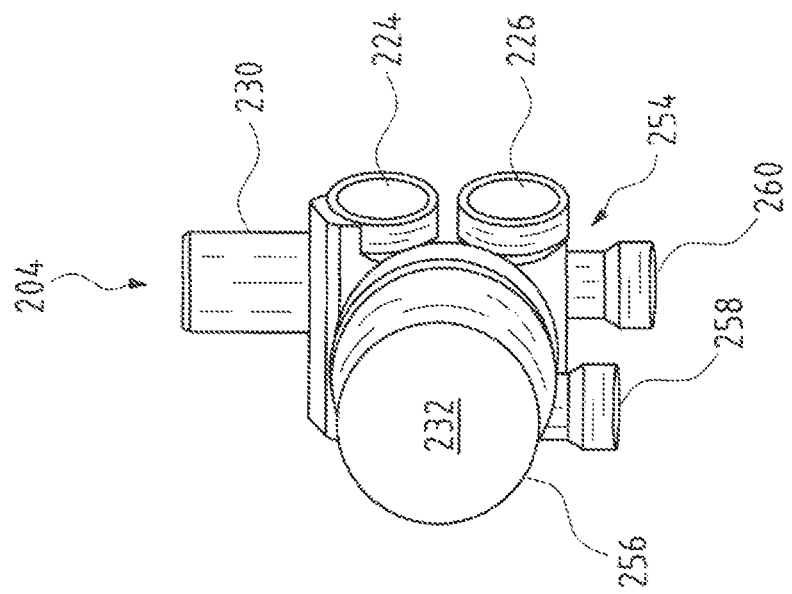
FIG. 11 is a perspective view of the load module of the hydraulic manifold according to FIGS. 2 and 3.
Figure 10:
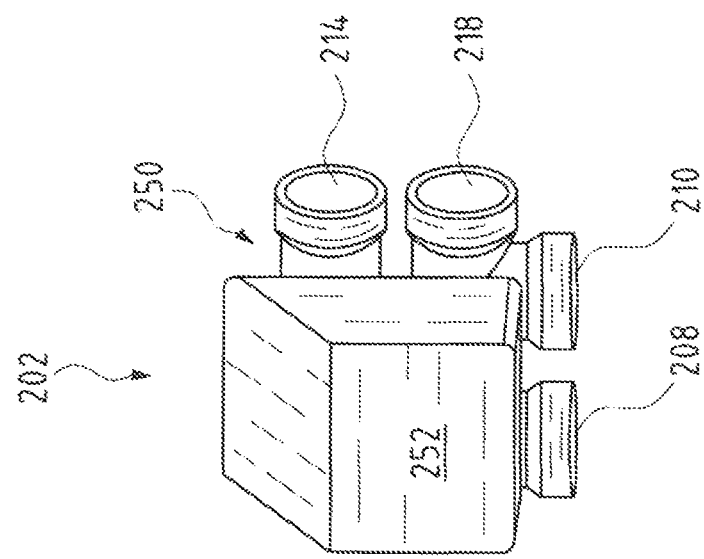
FIG. 10 is a perspective view of the main module of the manifold according to FIGS. 2 and 3.

FIGS. 8 and 9 show the assembled arrangement of six load modules 204 on the main module 202 as are shown in FIGS. 10 and 11. One can recognize that a hydraulic manifold is thus created, which comprises six feed connections 256 and six return connections 260 for six load circuits. All six load modules 204 are designed in an identical manner. The last load module 204, i.e. the one which is distant or away from the main module 202, is closed by an end piece 262 at its second feed coupling 224 and its second return coupling 226.

Figure 12:
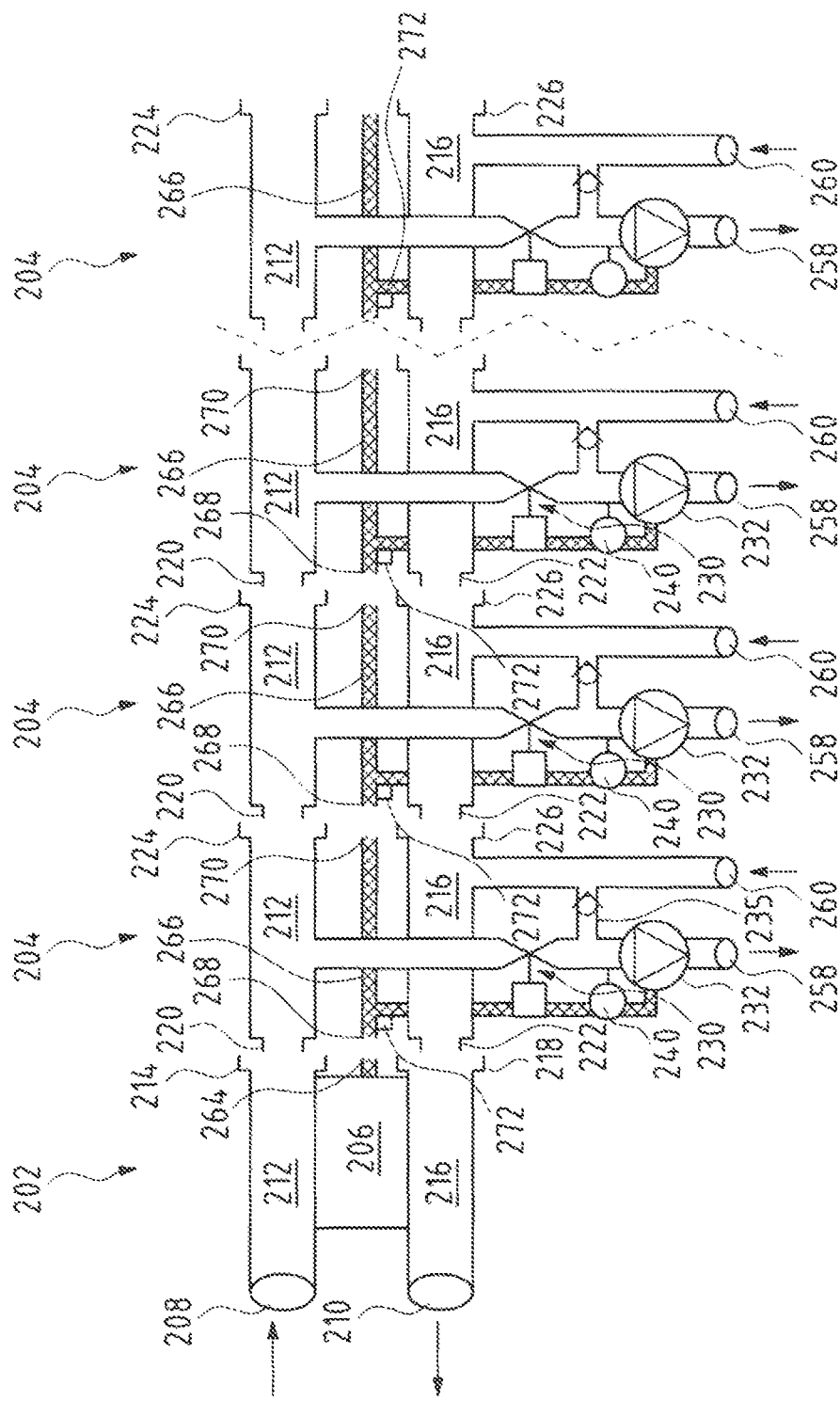
FIG. 12 is a schematic view of the modular construction of the hydraulic manifold according to FIGS. 2 and 3, in the non-assembled condition.
Figure 13:
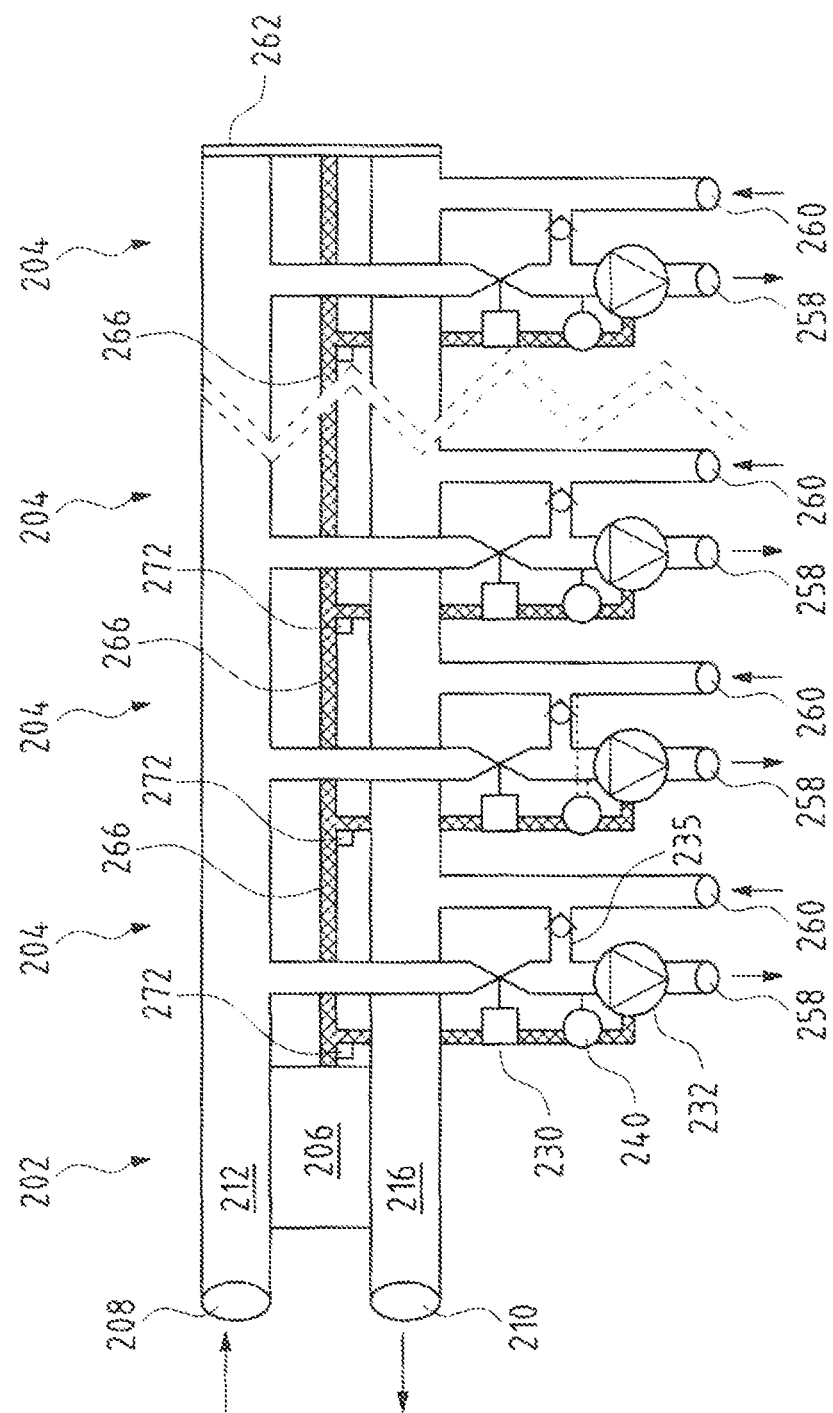
FIG. 13 is a schematic view, the construction of the hydraulic manifold according to FIG. 6, in the assembled condition.

The flow paths of the thus coupled hydraulic manifold are shown once again in more detail in FIG. 13. FIG. 12 shows the construction according to FIG. 13, in the non-assembled condition of the load modules 204. Only the arrangement of four load modules 204 is shown in FIGS. 12 and 13 in a schematic manner, Apart from the described hydraulic connections and elements, the main module 202 as well as the load modules 204 comprises electrical or electronic components. As described, the load module comprises the electronic control device 206. This is connected in the main module 202 to an electrical connection plug 264. An electrical connection 266 is provided in each of the load modules 204 and at its first axial end ends in an electrical connection plug 268 and at its opposite axial end ends in an electrical connection plug 270. Thereby, the electrical connection plugs 268 and 270 are designed such that the electrical connection plug 268 can engage with the electrical connection plug 264 on the main module 202 or with an electrical connection plug 270 of an adjacent load module, in order to form an electric coupling and to create an electric connection between the load module 204 and an adjacent load module 204 or the main module 202. In the inside of the load module 204, in each case the drive of the regulating valve 230, the temperature sensor 240 as well as the circulation pump 232 are connected to the electrical connection 266 which is designed as a data bus. The electrical connection 266 thereby serves for the energy transmission to these components and furthermore for the signal transmission to these components or from these components to the manifold control device 206 in the main module 202.

If a further load module 204 is stuck onto a load module 204, then an energy supply also to this subsequent load module 204 from the main module 202 is created by way of the electrical connection created via the connection plugs 268 and 270, as well as a data transmission from the main module 202 to this further load module 204 via the intermediately lying load module or load modules 204. The addressing of the individual load modules 204 can be effected via a model control device 272 in each module 204. The module control device 272 serves for the data communication with the central manifold device 206. For this, an address is allocated to each module control device 272, i.e. thus to each load module 204. This can be effected in an automatic manner by way of the manifold control device 206 on connecting the respective load module 204. Then the regulating valve 230 and the circulation pump 232 in each load module 204 can be individually activated via the address and the module control device 272, by the manifold control device 206, in order to effect a temperature regulation or volume flow regulation for the connected load circuit. The exit signal of the temperature sensor 240 and, as the case may be, of the temperature sensor 242 is fed back via the module control device 272 to the manifold control device 206 and from there can be incorporated into the regulation of the respective load module 204.

Room thermostats 274 are provided in the rooms to be thermally regulated (see FIG. 1), in order to permit a regulation dependent on room temperature. The room thermostats 274 communicate with a communication interface 276 of the control device 206. A desired nominal temperature can be set at the room thermostats 274. The room thermostat 274 sends a corresponding signal to the communication interface 276 of the control device 206, given a deviation of the actual temperature from this desired temperature. This control device thereupon activates the load circuit 228 associated with the room by way of switching on the circulation pump 232 in the associated load module 204. The described temperature regulation or flow regulation for the associated load circuit 228 is subsequently effected. If the inputted desired temperature at the room thermostat 274 is reached, then the room thermostat 274 sends a corresponding signal to the communication interface 276 of the control device 206. This control device thereupon deactivates the associated load circuit 228, i.e. switches off the load circuit 228 situated in the respective room, by way of the circulation pump 232 in the associated load module 204 being switched off.

While specific embodiments of the invention have been shown and described in detail to illustrate the application of the principles of the invention, it will be understood that the invention may be embodied otherwise without departing from such principles.

The invention claimed is:

1. A hydraulic manifold for a hydraulic heating and/or cooling system, the hydraulic manifold comprising a feed conduit and a return conduit, wherein the feed conduit comprises at least one feed connection and the return conduit comprises at least one return connection, for the connection of a load circuit, wherein the manifold has a modular construction and further comprises:

a main module comprising at least one section of the feed conduit and/or of the return conduit as well as an electrical connection, the main module further comprising a circulation pump assembly in the section of the feed conduit or in the section of the return conduit, the circulation pump assembly comprising at least one of a motor housing and an electronics housing; and at least one load module joined onto the main module comprising a section of the feed conduit with a feed connection, and/or a section of the return conduit with a return connection, as well as at least one regulating device for regulating the flow through a load circuit connected to the feed connection and to the return connection, the circulation pump assembly in the main module comprising a single pump configured for delivering fluid through the load circuit, wherein the main module further comprises a manifold control device, which is configured to control the circulation pump assembly and to control the regulating device in the at least one load module, the manifold control device being integrated into the at least one of the motor housing and the electronics housing.

2. The hydraulic manifold according to claim 1, wherein the main module comprises a mixing device, and the manifold control device is configured to control the mixing device.

3. The hydraulic manifold according to claim 1, wherein the main module and the load module comprise a mechanical and a hydraulic connection which correspond to one another, and the electrical connection, and the connections permit a releasable mechanical, hydraulic and electrical connection between the main module and the load module.

4. The hydraulic manifold according to claim 3, wherein the load module at the first longitudinal end comprises first hydraulic couplings in the form of a first return coupling which is connected to the section of the return conduit, and a first feed coupling which is connected to the section of the feed conduit.

5. The hydraulic manifold according to claim 4, wherein the load module at a second longitudinal end opposite the first longitudinal end comprises second hydraulic couplings in the form of a second return coupling which is connected to the section of the return conduit, and of a second feed coupling which is connected to the section of the feed conduit, wherein the second hydraulic couplings are arranged and configured such that the second hydraulic couplings are engageable with the first hydraulic couplings of a further load module.

6. The hydraulic manifold according to claim 1, wherein the main module on a side which faces the load module comprises hydraulic couplings which comprise a feed coupling and a return coupling and which are configured to be engageable with the first hydraulic couplings on the load module, the main module comprising a main module interior space, at least the section of the feed conduit and the single pump being arranged in the main module interior space.

7. The hydraulic manifold according to claim 6, wherein the manifold control device comprises at least one communication interface for receiving signals from an external control element.

8. The hydraulic manifold according to claim 1, wherein the hydraulic couplings are designed as plug-in couplings with a male coupling part and a corresponding female coupling part.

9. The hydraulic manifold according to claim 1, wherein the first and the second electrical plug-in contact, in the at least one load module, are connected to one another in an electrical manner to form a data bus.

10. The hydraulic manifold according to claim 1, wherein the regulating device is connected to the first electrical plug-in contact for a supply of energy.

11. The hydraulic manifold according to claim 1, wherein the at least one load module comprises an electronic module control device which is electrically connected to the first plug-in contact and to the regulating device, and is configured to communicate with the manifold control device in the main module as well as for activating the regulating device.

12. The hydraulic manifold according to claim 11, wherein the module control device of the at least one load module, and the manifold control device are connected to one another via a data bus and are configured for automatic communication coupling.

13. The hydraulic manifold according to claim 1, wherein the regulating device is designed as a motor-operated valve or as a circulation pump.

14. The hydraulic manifold according to claim 1, wherein the at least one load module at the first longitudinal end comprises at least one first mechanical coupling, and the main module at a side facing the load module comprises at least one second mechanical coupling which is releasably connectable to the first mechanical coupling.

15. The hydraulic manifold according to claim 1, wherein at least that part of the load module, in which the section of the feed conduit, the section of the return conduit as well as the feed connection and the return connection are situated, is a single-piece component formed of plastic.

16. The hydraulic manifold according to claim 15, wherein the at least one load module at a second longitudinal end comprises at least one second mechanical coupling which is releasably connectable to a first mechanical coupling at the first longitudinal end of a second load module.

17. The hydraulic manifold according to claim 1, wherein the at least one load module comprises an electronic module control device which is electrically connected to at least the first plug-in contact and to the regulating device, the regulating device comprising a regulating valve having an electric drive motor, wherein the regulating valve is actuated via the electric drive motor, the electric drive motor being electrically connected to at least the first plug-in contact.

18. The hydraulic manifold according to claim 17, wherein at least one temperature sensor is arranged in the load module, the temperature sensor detecting a temperature of a fluid flowing through the return connection, wherein the temperature sensor is signal-connected to the manifold control device, the temperature sensor being electrically connected to at least the first plug-in contact.

\* \* \* \* \*